(12) United States Patent
Nishino et al.

(10) Patent No.: US 11,458,706 B2
(45) Date of Patent: Oct. 4, 2022

(54) INTERLAYER FILM FOR LAMINATED GLASS, AND LAMINATED GLASS

(71) Applicant: SEKISUI CHEMICAL CO., LTD., Osaka (JP)

(72) Inventors: Hiromitsu Nishino, Kouka (JP); Yuusuke Oota, Kouka (JP); Koji Kido, Kouka (JP); Susumu Hayase, Kouka (JP); Hideto Yoshimoto, Kouka (JP); Jun Ishida, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/766,245

(22) PCT Filed: Dec. 18, 2018

(86) PCT No.: PCT/JP2018/046570
§ 371 (c)(1),
(2) Date: May 21, 2020

(87) PCT Pub. No.: WO2019/124375
PCT Pub. Date: Jun. 27, 2019

(65) Prior Publication Data
US 2020/0406588 A1 Dec. 31, 2020

(30) Foreign Application Priority Data
Dec. 19, 2017 (JP) .............................. JP2017-243269

(51) Int. Cl.
*B32B 17/10* (2006.01)
*B32B 3/26* (2006.01)
*B60K 35/00* (2006.01)

(52) U.S. Cl.
CPC ........ *B32B 17/10165* (2013.01); *B32B 3/263* (2013.01); *B32B 17/10* (2013.01);
(Continued)

(58) Field of Classification Search
CPC .. B32B 3/26; B32B 3/263; B32B 3/30; B32B 17/06; B32B 17/064; B32B 17/10;
(Continued)

(56) References Cited

U.S. PATENT DOCUMENTS

| 5,812,332 A | 9/1998 | Freeman |
| 2003/0215610 A1 | 11/2003 | DiGiampaolo et al. |

(Continued)

FOREIGN PATENT DOCUMENTS

| CN | 1642866 A | 7/2005 |
| CN | 107074648 A | 8/2017 |

(Continued)

OTHER PUBLICATIONS

Sekisui; "S-LEC™ Sound Acoustic Film", Oct. 15, 2007, pp. 1-6, XP055823574, Retrieved from the Internet: URL: https://www.s-lec.eu/wp-content/uploads/saf_eng.pdf (retrieved on Jul. 13, 2021).
(Continued)

*Primary Examiner* — Lawrence D Ferguson
(74) *Attorney, Agent, or Firm* — Cheng Law Group, PLLC

(57) ABSTRACT

Provided is an interlayer film for laminated glass capable of suppressing multiple images. An interlayer film for laminated glass according to the present invention is used while it is arranged between a first lamination glass member having a wedge angle of 0.10 mrad or more, and a second lamination glass member; the interlayer film has a wedge angle of less than 0.10 mrad, and has a maximum value of partial wedge angles A of 0.15 mrad or less when the partial wedge angles A of the interlayer film are measured in "the step 1 of selecting points A at 2-mm intervals starting at the position of 20 cm from the one end toward the other end of the interlayer film and ending at the position of 20 cm from the other end toward the one end of the interlayer film" and
(Continued)

"the step 2 of calculating the partial wedge angles A of the interlayer film in each partial region A of 80 mm centered at each of the points A in the direction connecting the one end and the other end" in this order.

15 Claims, 8 Drawing Sheets

(52) U.S. Cl.
CPC .. *B32B 17/10036* (2013.01); *B32B 17/10761* (2013.01); *B60K 35/00* (2013.01); *B32B 2457/20* (2013.01); *B32B 2605/006* (2013.01); *B60K 2370/1529* (2019.05); *B60K 2370/785* (2019.05)

(58) Field of Classification Search
CPC .......... B32B 17/10165; B32B 17/1055; B32B 17/10559; B32B 17/10761; B32B 17/10568; B32B 17/10577; B32B 17/10587; B32B 27/06; B32B 27/30; B32B 27/306; B32B 17/10036; B32B 17/1066; B32B 2250/03; B32B 2307/102; B32B 2457/20; B32B 2605/00; B32B 2605/006; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959; B60J 1/00; B60J 1/02; B60K 2370/1529; B60K 2370/785; B60K 35/00; C08K 5/00; C08L 101/00; G02B 27/01; G09F 9/00
USPC ....... 428/105, 112, 141, 142, 147, 156, 159, 428/161, 162, 163, 167, 172, 173, 212, 428/213, 214
See application file for complete search history.

(56) References Cited

U.S. PATENT DOCUMENTS

| | | | |
|---|---|---|---|
| 2007/0009714 A1* | 1/2007 | Lee | B32B 17/10568 428/172 |
| 2007/0148472 A1 | 6/2007 | Masaki et al. | |
| 2009/0294212 A1 | 12/2009 | Miyai | |
| 2011/0094825 A1 | 4/2011 | Miyai | |
| 2012/0003428 A1 | 1/2012 | Miyai | |
| 2014/0178651 A1 | 6/2014 | Miyai | |
| 2015/0258747 A1 | 9/2015 | Miyai | |
| 2016/0168353 A1* | 6/2016 | Spangler | B32B 17/10761 428/172 |
| 2016/0291324 A1 | 10/2016 | Arndt et al. | |
| 2016/0341960 A1 | 11/2016 | Miyai | |
| 2017/0274630 A1 | 9/2017 | Oota et al. | |
| 2017/0274631 A1 | 9/2017 | Oota et al. | |
| 2017/0305240 A1 | 10/2017 | Aoki et al. | |
| 2017/0334759 A1* | 11/2017 | Yamato | B32B 17/10036 |
| 2018/0157033 A1 | 6/2018 | Arndt et al. | |
| 2018/0267308 A1 | 9/2018 | Sadakane | |
| 2018/0312044 A1 | 11/2018 | Sadakane | |
| 2019/0061322 A1 | 2/2019 | Oota et al. | |

FOREIGN PATENT DOCUMENTS

| | | |
|---|---|---|
| EP | 3 381 879 A1 | 10/2018 |
| EP | 3 381 880 A1 | 10/2018 |
| JP | 4-502525 A | 5/1992 |
| JP | 2007-223883 A | 9/2007 |
| JP | 2017-502125 A | 1/2017 |
| JP | 2017-105665 A | 6/2017 |
| WO | WO-91/06031 A1 | 5/1991 |
| WO | WO-2007/132777 A1 | 11/2007 |
| WO | WO-2016/052421 A1 | 4/2016 |
| WO | WO-2016/121559 A1 | 8/2016 |
| WO | WO-2017/039004 A1 | 3/2017 |
| WO | WO-2017/090561 A1 | 6/2017 |
| WO | WO-2017/090562 A1 | 6/2017 |

OTHER PUBLICATIONS

Supplementary European Search Report for the Application No. 18 892 946.7 dated Jul. 26, 2021.
The First Office Action for the Application No. 201880075434.4 from The State Intellectual Property Office of the People's Republic of China dated Mar. 1, 2022.
International Search Report for the Application No. PCT/JP2018/046570 dated Mar. 26, 2019.
Written Opinion of the International Searching Authority (PCT/ISA/237) for Application No. PCT/JP2018/046570 dated Mar. 26, 2019.
Written Opinion of the International Searching Authority (PCT/ISA/237) for Application No. PCT/JP2018/046570 dated Mar. 26, 2019 (English Translation dated Jul. 2, 2020).

* cited by examiner

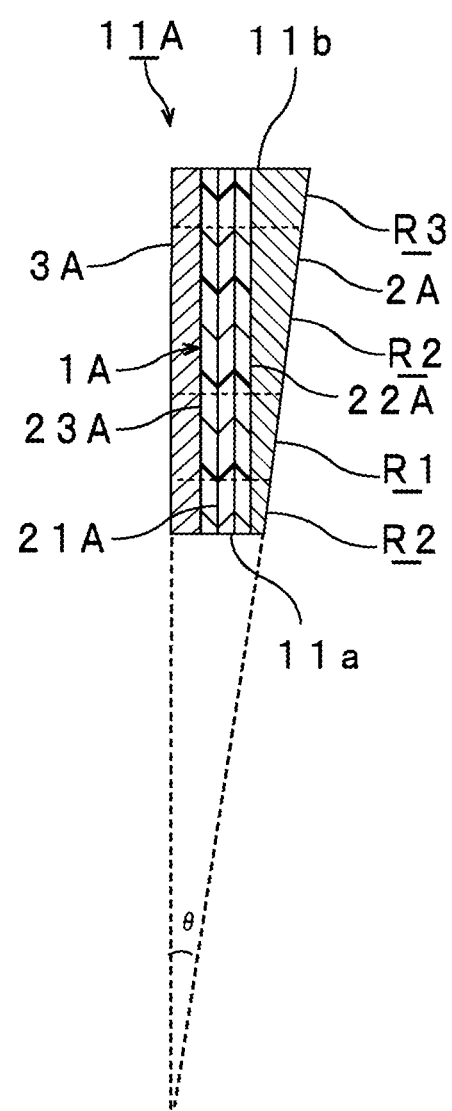

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Moreover, as the laminated glass used for automobiles, a head-up display (HUD) has been known. In a HUD, it is possible to display measured information including automobile traveling data such as speed on the windshield of the automobile, and the driver can recognize as if the display were shown in front of the windshield.

In the HUD, there is a problem that the measured information or the like is doubly observed.

In order to suppress double images, a wedge-like shaped interlayer film has been used. The following Patent Document 1 discloses a sheet of laminated glass in which a wedge-like shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by another glass plate can be focused into one point to make an image in the visual field of a driver. As such, the display of measured information is hard to be observed doubly and the visibility of a driver is hardly hindered.

The following Patent Document 2 discloses a laminated glass in which a rectangular shaped interlayer film is sandwiched between a wedge-like shaped glass plate and a rectangular shaped glass plate. Patent Document 2 also discloses a laminated glass in which a rectangular shaped interlayer film is sandwiched between a wedge-like shaped glass plate and a wedge-like shaped glass plate.

RELATED ART DOCUMENT

Patent Document

Patent Document 1: JP H4-502525 T
Patent Document 2: WO 2017/090561 A1 SUMMARY OF THE INVENTION

Problems to be Solved by the Invention

In the HUD, it is desired that multiple images be not generated in the display region for the measured information or the like. The multiple images refer to the phenomenon that multiple images are observed, for example, by illumination of information from an information display device.

Conventionally, a wedge angle of a wedge-like shaped interlayer film is adjusted, or a wedge angle of a wedge-like shaped glass plate is adjusted so as to suppress multiple images.

However, it is difficult to sufficiently suppress multiple images only by adjusting the wedge angle of the wedge-like shaped interlayer film or the wedge angle of the wedge-like shaped glass plate.

It is an object of the present invention to provide an interlayer film for laminated glass capable of suppressing multiple images. It is also an object of the present invention to provide a laminated glass capable of suppressing multiple images.

Means for Solving the Problems

According to a broad aspect of the present invention, there is provided an interlayer film for laminated glass (in this description, "interlayer film for laminated glass" is sometimes abbreviated as "interlayer film"), the interlayer film being arranged between a first lamination glass member having a wedge angle of 0.10 mrad or more, and a second lamination glass member, and used for obtaining a laminated glass, the interlayer film being an interlayer film for laminated glass to be used for obtaining a laminated glass having one end, and the other end being at an opposite side of the one end and having a thickness larger than a thickness of the one end, the interlayer film having a wedge angle of less than 0.10 mrad, a maximum value of partial wedge angles A of the interlayer film being 0.15 mrad or less when the partial wedge angles A of the interlayer film are measured in the following measurement.

The measurement of partial wedge angles A: Partial wedge angles A of the interlayer film are measured in the following step 1 and step 2 in this order.

Step 1: selects points A at 2-mm intervals starting at the position of 20 cm from the one end toward the other end of the interlayer film and ending at the position of 20 cm from the other end toward the one end of the interlayer film.

Step 2: calculates the partial wedge angles A of the interlayer film in each partial region A of 80 mm centered at each of the points A in a direction connecting the one end and the other end.

In a specific aspect of the interlayer film according to the present invention, a maximum value of the partial wedge angles A is 0.13 mrad or less.

In a specific aspect of the interlayer film according to the present invention, a maximum value of the partial wedge angles A is more than 0 mrad.

In a specific aspect of the interlayer film according to the present invention, the interlayer film is an interlayer film for laminated glass arranged between a first lamination glass member having a wedge angle of 0.10 mrad or more and a second lamination glass member having a wedge angle of 0.10 mrad or more and used for obtaining a laminated glass.

In a specific aspect of the interlayer film according to the present invention, the interlayer film is an interlayer film for laminated glass for use in a laminated glass that is a head-up display, and has a region for display corresponding to a display region of a head-up display.

In a specific aspect of the interlayer film according to the present invention, the interlayer film contains a thermoplastic resin.

In a specific aspect of the interlayer film according to the present invention, the interlayer film contains a plasticizer.

In a specific aspect of the interlayer film according to the present invention, the interlayer film includes a first layer and a second layer arranged on a first surface side of the first layer.

In a specific aspect of the interlayer film according to the present invention, the interlayer film includes a third layer arranged on a second surface side opposite to the first surface of the first layer.

According to a broad aspect of the present invention, there is provided a laminated glass having one end, and the other end being at an opposite side of the one end and having a thickness larger than a thickness of the one end, the laminated glass including a first lamination glass member, a second lamination glass member, and an interlayer film arranged between the first lamination glass member and the second lamination glass member, the first lamination glass member having a wedge angle of 0.10 mrad or more, the interlayer film having a wedge angle of less than 0.10 mrad, a maximum value of partial wedge angles A in the following measurement of partial wedge angles A of the interlayer film being 0.15 mrad or less.

The measurement of partial wedge angles A: Partial wedge angles A of the interlayer film are measured in the following step 1 and step 2 in this order.

Step 1: selects points A at 2-mm intervals starting at the position of 20 cm from the one end toward the other end of the interlayer film and ending at the position of 20 cm from the other end toward the one end of the interlayer film.

Step 2: calculates the partial wedge angles A of the interlayer film in each partial region A of 80 mm centered at each of the points A in a direction connecting the one end and the other end.

In a specific aspect of the laminated glass according to the present invention, a maximum value of the partial wedge angles A is 0.13 mrad or less.

In a specific aspect of the laminated glass according to the present invention, a maximum value of the partial wedge angles A is more than 0 mrad.

In a specific aspect of the laminated glass according to the present invention, the laminated glass has a wedge angle of 0.10 mrad or more.

In a specific aspect of the laminated glass according to the present invention, the second lamination glass member has a wedge angle of 0.10 mrad or more.

In a specific aspect of the laminated glass according to the present invention, the laminated glass is a laminated glass that is a head-up display, and the laminated glass has a display region of a head-up display.

Effect of the Invention

The interlayer film for laminated glass according to the present invention is an interlayer film for laminated glass arranged between a first lamination glass member having a wedge angle of 0.10 mrad or more and a second lamination glass member and used for obtaining a laminated glass. The interlayer film for laminated glass according to the present invention is an interlayer film for laminated glass used for obtaining a laminated glass having one end, and the other end being at the opposite side of the one end and having a thickness larger than a thickness of the one end. The interlayer film for laminated glass according to the present invention has a wedge angle of less than 0.10 mrad. In the interlayer film for laminated glass according to the present invention, a maximum value of partial wedge angles A is 0.15 mrad or less in measurement of partial wedge angles A of the interlayer film. Since the interlayer film for laminated glass according to the present invention is provided with the above-mentioned configurations, multiple images can be suppressed.

The laminated glass according to the present invention has one end and the other end being at the opposite side of the one end and having a thickness larger than a thickness of the one end. The laminated glass according to the present invention includes a first lamination glass member, a second lamination glass member, and an interlayer film for laminated glass arranged between the first lamination glass member and the second lamination glass member. In the laminated glass according to the present invention, the first lamination glass member has a wedge angle of 0.10 mrad or more, and the interlayer film has a wedge angle of less than 0.10 mrad. In the laminated glass according to the present invention, a maximum value of partial wedge angles A is 0.15 mrad or less in measurement of partial wedge angles A of the interlayer film. Since the laminated glass according to the present invention is provided with the above-mentioned configurations, multiple images can be suppressed.

BRIEF DESCRIPTION OF DRAWINGS

FIG. 2A is a sectional view schematically showing laminated glass in accordance with an embodiment of the present invention.

MODE (S) FOR CARRYING OUT THE INVENTION

Figure 1A:
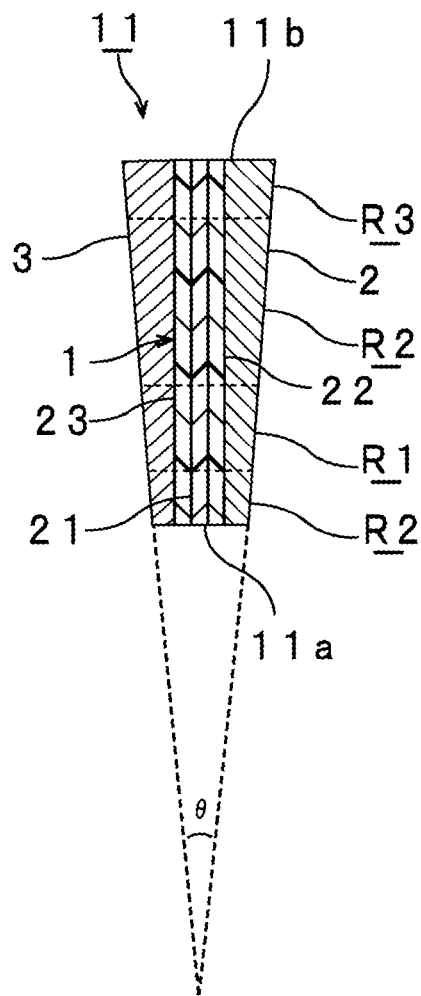
FIG. 1A and FIG. 1B are a sectional view and a front view, respectively, schematically showing a laminated glass, in accordance with an embodiment of the present invention.

Hereinafter, the present invention will be described in detail.

The interlayer film for laminated glass (in the present specification, sometimes abbreviated as "interlayer film") according to the present invention is used for laminated glass. The interlayer film according to the present invention is arranged between a first lamination glass member having a wedge angle of 0.10 mrad or more and a second lamination glass member and used for obtaining a laminated glass. The interlayer film according to the present invention is an interlayer film for laminated glass used for obtaining a laminated glass having one end, and the other end being at the opposite side of the one end and having a thickness larger than a thickness of the one end.

The laminated glass according to the present invention has one end and the other end being at an opposite side of the one end and having a thickness larger than a thickness of the one end. The laminated glass according to the present invention includes a first lamination glass member, a second lamination glass member, and an interlayer film for laminated glass (in the present specification, sometimes abbreviated as "interlayer film"). In the laminated glass according to the present invention, the interlayer film is arranged between the first lamination glass member and the second lamination glass member. In the laminated glass according to the present invention, the first lamination glass member has a wedge angle of 0.10 mrad or more.

The first lamination glass member is a wedge-like shaped lamination glass member.

The "wedge angle" in the first lamination glass member having a wedge angle of 0.10 mrad or more is different from "partial wedge angle", and means a wedge angle of the first lamination glass member as a whole.

The second lamination glass member may have a wedge angle of 0.10 mrad or more, or may have a wedge angle of less than 0.10 mrad. The second lamination glass member may be a wedge-like shaped lamination glass member, or may be a rectangular shaped lamination glass member.

The "wedge angle" in the second lamination glass member is different from "partial wedge angle", and means a wedge angle of the second lamination glass member as a whole.

The interlayer film according to the present invention, and the interlayer film in the laminated glass according to the present invention have a wedge angle of less than 0.10 mrad.

The "wedge angle" in the interlayer film having a wedge angle of less than 0.10 mrad is different from "partial wedge angle" and means a wedge angle of the interlayer film as a whole.

The first lamination glass member has one end and the other end being at the opposite side of the one end. The one end and the other end are end parts of both sides facing each other in the first lamination glass member. In the first lamination glass member, the thickness of the other end is larger than the thickness of the one end.

The second lamination glass member has one end and the other end being at the opposite side of the one end. The one end and the other end are end parts of both sides facing each other in the second lamination glass member.

The laminated glass has one end and the other end being at the opposite side of the one end. The one end and the other end are end parts of both sides facing each other in the laminated glass. In the laminated glass according to the present invention, the thickness of the other end is larger than the thickness of the one end.

The interlayer film has one end and the other end being at the opposite side of the one end. The one end and the other end are end parts of both sides facing each other in the interlayer film.

The one ends of the first lamination glass member, the second lamination glass member and the interlayer film are at the side of the one end of the laminated glass. The other ends of the first lamination glass member, the second lamination glass member and the interlayer film are at the side of the other end of the laminated glass.

In the interlayer film according to the present invention, and the interlayer film in the laminated glass according to the present invention, the following measurement of partial wedge angles A is performed.

Step 1: selects points A at 2-mm intervals starting at the position of 20 cm from the one end toward the other end of the interlayer film and ending at the position of 20 cm from the other end toward the one end of the interlayer film.

Step 2: calculates the partial wedge angles A of the interlayer film in each partial region A of 80 mm centered at each of the points A in the direction connecting the one end and the other end.

In the above step 1, points are selected up to the position where selection of points at 2-mm intervals can be made from the one end side toward the other end side (positions of which interval is not less than 2 mm).

In the step 2, the partial region A closest to the one end side of the interlayer film is a partial region A1 of 16 cm to 24 cm from the one end, and the next partial region A is a partial region A2 of 16.2 cm to 24.2 cm from the one end. Neighboring two partial regions A overlap with each other by 78 mm in the direction connecting the one end and the other end. Each partial region A is a partial region of $(16+0.2 \times n)$ cm to $(24+0.2 \times n)$ cm from the one end (n is an integer).

In the step 2, a partial wedge angle calculated at each partial region A is referred to as partial wedge angle ($\theta$A).

One partial wedge angle ($\theta$A) is a wedge angle determined from an approximation curve of the variation in thickness from the end part of one end side toward the end part of the other end side in one partial region A.

In the interlayer film according to the present invention, and the laminated glass according to the present invention, a maximum value of partial wedge angles A is 0.15 mrad or less in the measurement of partial wedge angles A. The maximum value of partial wedge angles A is the largest value among all the partial wedge angles A measured in each partial region A.

Since the interlayer film according to the present invention, and the laminated glass according to the present invention are provided with the above-mentioned configurations, multiple images can be suppressed. In particular, since the first lamination glass member has a wedge angle of 0.10 mrad or more, the interlayer film has a wedge angle of less than 0.10 mrad, and the maximum value of partial wedge angles A is 0.15 mrad or less, multiple images can be suppressed. In the present invention, generation of multiple images is significantly suppressed when the display information from the display unit is reflected by the laminated glass.

In the laminated glass, measured information such as the speed which is sent from a control unit and the like can be projected onto the windshield from a display unit of the instrumental panel. Accordingly, without making a driver of an automobile move his or her visual field downward, a front visual field and measured information can be visually recognized simultaneously.

From the viewpoint of further suppressing multiple images, it is preferred that the wedge angle of the first lamination glass member be larger than the wedge angle of the interlayer film. From the viewpoint of further suppressing multiple images, the wedge angle of the first lamination glass member is larger than the wedge angle of the interlayer film preferably by 0.05 mrad or more, more preferably by 0.10 mrad or more, further preferably by 0.15 mrad or more, especially preferably by 0.20 mrad or more, most preferably by 0.25 mrad or more.

From the viewpoint of further suppressing multiple images, it is preferred that the wedge angle of the second lamination glass member be larger than the wedge angle of the interlayer film. From the viewpoint of further suppressing multiple images, the wedge angle of the second lamination glass member is larger than the wedge angle of the interlayer film preferably by 0.05 mrad or more, more preferably by 0.10 mrad or more, further preferably by 0.15 mrad or more, especially preferably by 0.20 mrad or more, most preferably by 0.25 mrad or more.

The interlayer film according to the present invention, and the interlayer film in the laminated glass according to the present invention have a one-layer structure or a two or more-layer structure. The interlayer film may have a one-layer structure and may have a two or more-layer structure. The interlayer film may have a two-layer structure, may have a three-layer structure, and may have a three or more-layer structure. The interlayer film may be a single-layered interlayer film and may be a multi-layered interlayer film.

The interlayer film has, for example, a region for display corresponding to a display region of a head-up display. The region for display is a region capable of favorably displaying information.

The interlayer film is suitably used for laminated glass serving as a head-up display (HUD). It is preferred that the interlayer film be an interlayer film for HUD.

The laminated glass has, for example, a display region of a head-up display. The display region is a region capable of favorably displaying information.

It is preferred that the laminated glass serve as a head-up display (HUD).

A head-up display system can be obtained by using the aforementioned head-up display. The head-up display system includes the laminated glass, and a light source device for irradiating the laminated glass with light for image display. The light source device can be attached, for example, to a dashboard in a vehicle. By irradiating the display region of the laminated glass with light from the light source device, it is possible to achieve image display.

The maximum value of the partial wedge angles A is 0.15 mrad or less. From the viewpoint of further suppressing multiple images, the maximum value of the partial wedge angles A is preferably 0.13 mrad or less, more preferably 0.10 mrad or less.

The maximum value of the partial wedge angles A may be 0 mrad (not being wedge-like shaped at 0 mrad), may be more than 0 mrad, may be 0.05 mrad or more, and may be 0.07 mrad or more.

The wedge angle of the first lamination glass member is 0.10 mrad or more. From the viewpoint of further suppressing multiple images in the present invention, the wedge angle of the first lamination glass member is preferably 0.15 mrad or more, more preferably 0.20 mrad or more, further preferably 0.25 mrad or more, and is preferably 2.0 mrad or less, more preferably 1.5 mrad or less.

The wedge angle of the second lamination glass member is 0 mrad or more (not being wedge-like shaped at 0 mrad). From the viewpoint of further suppressing multiple images in the present invention, the wedge angle of the second lamination glass member is preferably 0 mrad or more, more preferably 0.10 mrad or more, further preferably 0.15 mrad or more, especially preferably 0.20 mrad or more, most preferably 0.25 mrad or more. From the viewpoint of further suppressing multiple images in the present invention, the wedge angle of the second lamination glass member is preferably 2.0 mrad or less, more preferably 1.5 mrad or less.

The wedge angle of the interlayer film is less than 0.10 mrad. From the viewpoint of further suppressing multiple images, the wedge angle of the interlayer film is preferably 0.07 mrad or less, more preferably 0.05 mrad or less.

The wedge angle of the interlayer film may be 0 mrad (not being wedge-like shaped at 0 mrad), may be more than 0 mrad, may be 0.05 mrad or more, and may be 0.07 mrad or more.

From the viewpoint of further suppressing multiple images in the present invention, the wedge angle of the laminated glass is preferably 0.10 mrad or more, more preferably 0.15 mrad or more, further preferably 0.20 mrad or more, most preferably 0.25 mrad or more, and is preferably 2.0 mrad or less, more preferably 1.5 mrad or less.

From the viewpoint of obtaining a laminated glass suited for a vehicle in which the attachment angle of the windshield is large, such as a truck or a bus, the wedge angle of the laminated glass is preferably 0.10 mrad or more, more preferably 0.15 mrad or more, further preferably 0.20 mrad or more, especially preferably 0.25 mrad or more.

From the viewpoint of obtaining a laminated glass suited for a vehicle in which the attachment angle of the windshield is small, such as a sports car, the wedge angle of the laminated glass is preferably 0.9 mrad or less, more preferably 0.8 mrad or less.

The wedge angle $\theta$ of the laminated glass is an interior angle formed at the intersection point between a straight line connecting a point on the first surface (one surface) of the maximum thickness part in the laminated glass and a point on the first surface of the minimum thickness part in the laminated glass and a straight line connecting a point on the second surface (the other surface) of the maximum thickness part in the laminated glass and a point on the second surface of the minimum thickness part in the laminated glass. When there are a plurality of maximum thickness parts, there are a plurality of minimum thickness parts, the maximum thickness part is located in a certain region, or the minimum thickness part is located in a certain region, the maximum thickness part and the minimum thickness part for determining the wedge angle $\theta$ are selected so that the wedge angle $\theta$ to be determined is the maximum. The wedge angles of the first lamination glass member, the second lamination glass member, and the interlayer film can be determined in the same manner as for the wedge angle of the laminated glass.

The wedge angle of the interlayer film, the wedge angle of the first lamination glass member, the wedge angle of the second lamination glass member, and the wedge angle $\theta$ of the laminated glass can be approximately calculated in the following manner. Thicknesses of the interlayer film, the first lamination glass member, the second lamination glass member, and the laminated glass are measured in each of the maximum thickness part and the minimum thickness part. On the basis of the result of (an absolute value of difference between the thickness in the maximum thickness part and the thickness in the minimum thickness part ($\mu$m)÷a distance between the maximum thickness part and the minimum thickness part (mm)), a wedge angle is approximately calculated.

The wedge angle in a perfectly rectangular shaped lamination glass member and a perfectly rectangular shaped interlayer film is 0 mrad. The angle of 0 mrad when the lamination glass member is not wedge-like shaped, or the angle of 0 mrad when the interlayer film is not wedge-like shaped are also referred to as a wedge angle.

As a measuring device for use for measurement of a wedge angle of the interlayer film, and a thickness of the interlayer film, a contact type thickness measuring instrument "TOF-4R" (available from Yamabun Electronics Co., Ltd.) or the like can be recited.

Measurement of the thickness is conducted so that the distance is the shortest from the one end toward the other end by using the above-described measuring device at a film conveyance speed of 2.15 to 2.25 mm/minutes.

For measuring the wedge angle of the interlayer film, the wedge angle of the first lamination glass member, the wedge angle of the second lamination glass member, the wedge angle θ of the laminated glass, the thickness of the interlayer film, the thickness of the first lamination glass member, the thickness of the second lamination glass member, and the thickness of the laminated glass after the laminated glass is formed with the interlayer film, an appropriate measuring device is used. As the measuring device, a non-contact multi-layer measuring device "OPTIGAUGE" (available from Lumetrics, Inc.) or the like is recited. The thicknesses of the interlayer film, the first lamination glass member, and the second lamination glass member can be measured in the form of the laminated glass.

Hereinafter, specific embodiments of the present invention will be described with reference to the drawings.

Figure 1B:
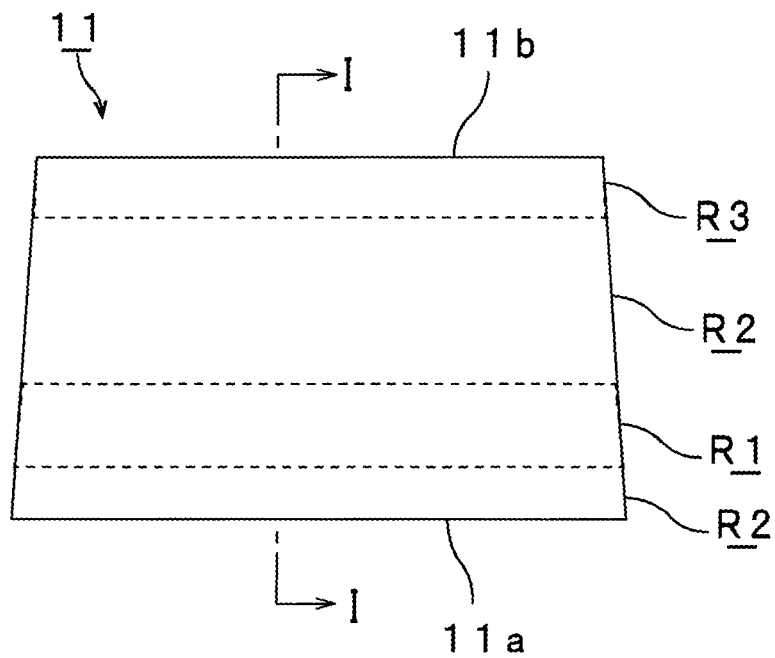
Figure 1C:
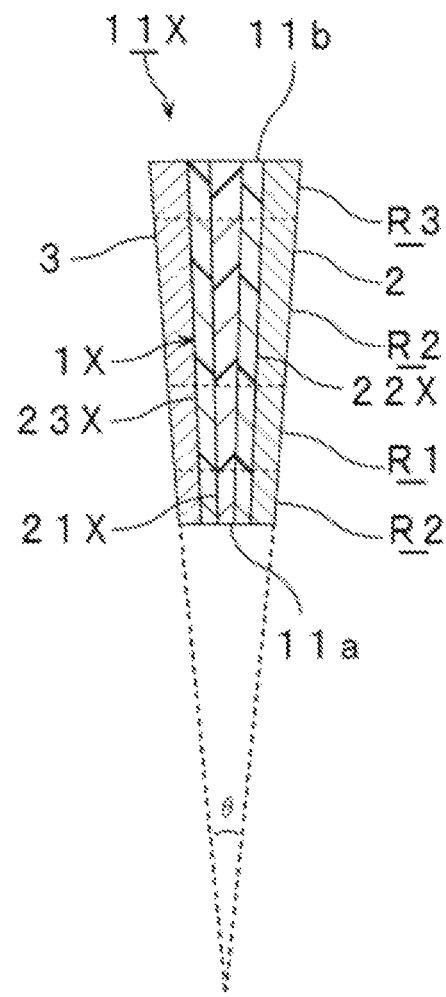
FIG. 1C and FIG. 1D are a sectional view and a front view, respectively, schematically showing a laminated glass, in accordance with an embodiment of the present invention.
Figure 1D:
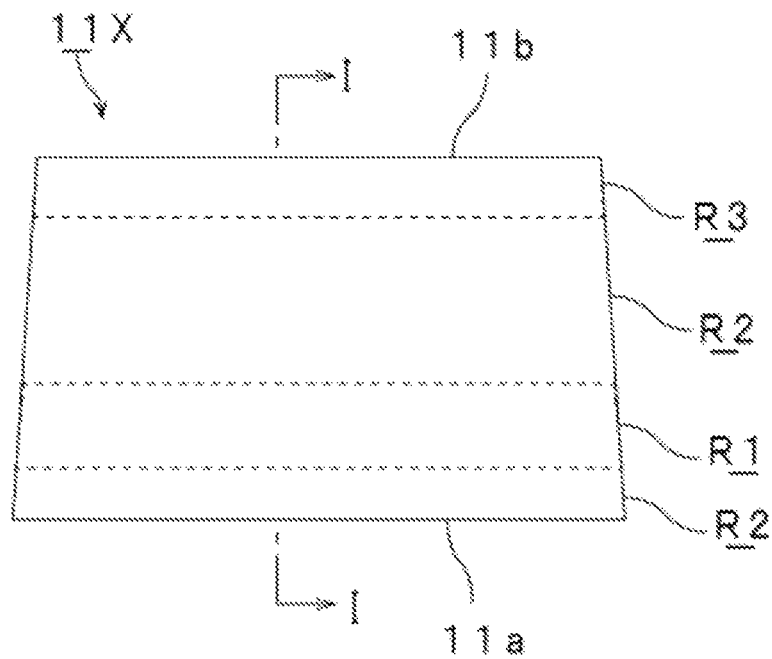
Figure 2B:
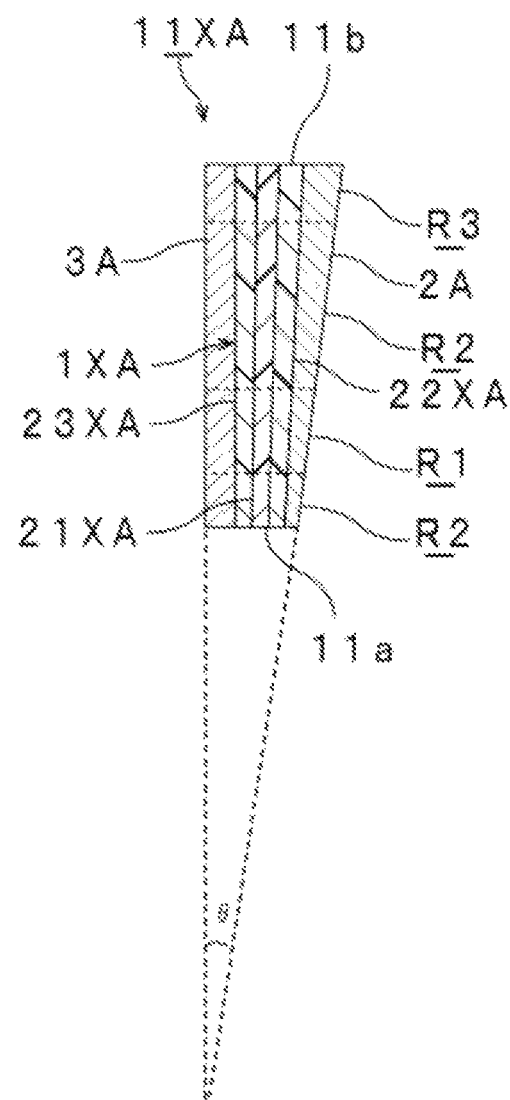
FIG. 2B is a sectional view schematically showing laminated glass in accordance with an embodiment of the present invention.

FIGS. 1A and 1B are a sectional view and a front view, respectively, schematically showing a laminated glass, in accordance with an embodiment of the present invention. FIGS. 1C and 1D are a sectional view and a front view, respectively, schematically showing a laminated glass, in accordance with another embodiment of the present invention. FIG. 1A is a sectional view along the line I-I in FIG. 1B. FIG. 1C is a sectional view along the line I-I in FIG. 1D. FIGS. 2A and 2B are sectional views schematically showing laminated glass in accordance with other embodiments of the present invention.

The size and dimension of the laminated glass in FIG. 1A, FIG. 1B, FIG. 1C, FIG. 1D, FIG. 2A, FIG. 2B, and later described drawings are appropriately changed from the actual size and shape for convenience of illustration. In FIG. 1A, FIG. 1B, FIG. 1C, FIG. 1D, FIG. 2A, FIG. 2B, and later-described drawings, for convenience of illustration, the thickness of the laminated glass and the thickness of each member constituting the laminated glass, and the wedge angle (θ) are shown differently from actual thicknesses and wedge angle. In FIG. 1A, FIG. 1B, FIG. 1C, FIG. 1D, FIG. 2A, FIG. 2B, and later-described drawings, different points are replaceable.

FIG. 1A and FIG. 1B show a laminated glass 11. FIG. 1C and FIG. 1D show a laminated glass 11X. FIG. 2A shows a laminated glass 11A. FIG. 2B shows a laminated glass 11XA.

The laminated glass 11, 11X, 11A, 11XA has one end 11a and the other end 11b at the opposite side of the one end 11a. The one end 11a and the other end 11b are end parts of both sides facing each other. The thickness of the other end 11b of the laminated glass 11, 11X, 11A, 11XA is larger than the thickness of the one end 11a thereof. Accordingly, the laminated glass 11, 11X, 11A, 11XA has a region being thinner in thickness and a region being thicker in thickness.

The laminated glass 11, 11X, 11A, 11XA is a head-up display. The laminated glass 11, 11X, 11A, 11XA has a display region R1 of a head-up display.

The laminated glass 11, 11X, 11A, 11XA has a surrounding region R2 neighboring the display region R1.

The laminated glass 11, 11X, 11A, 11XA has a shading region R3 that is separate from the display region R1. The shading region R3 is located in an edge portion of the laminated glass 11, 11X, 11A, 11XA.

The laminated glass 11, 11X shown in FIG. 1A, FIG. 1B, FIG. 1C, and FIG. 1D includes a first lamination glass member 2, an interlayer film 1, 1X and a second lamination glass member 3. The first lamination glass member 2, the interlayer film 1, 1X, and the second lamination glass member 3 are arranged side by side in this order. The interlayer film 1, 1X is arranged between the first lamination glass member 2 and the second lamination glass member 3.

The interlayer film 1, 1X is a multi-layered interlayer film having a two or more-layer structure. Specifically, the interlayer film 1, 1X has a three-layer structure. The interlayer film 1, 1X includes a second layer 22, 22X, a first layer 21, 21X, and a third layer 23, 23X. The second layer 22, 22X, the first layer 21, 21X, and the third layer 23, 23X are arranged side by side in this order. The first layer 21, 21X is arranged between the second layer 22, 22X and the third layer 23, 23X. The second layer 22, 22X is arranged on a first surface side of the first layer 21, 21X. The third layer 23, 23X is arranged on a second surface side opposite to the first surface of the first layer 21, 21X.

The first lamination glass member 2 is a wedge-like shape, and has a wedge angle of 0.10 mrad or more. The second lamination glass member 3 is a wedge-like shape, and has a wedge angle of 0.10 mrad or more. The interlayer film 1, 1X is rectangular shaped, and has a wedge angle of less than 0.10 mrad. The first layer 21, 21X, the second layer 22, 22X, and the third layer 23, 23X are rectangular shaped, and have a wedge angle of less than 0.10 mrad. The maximum value of the partial wedge angles A of the interlayer film 1, 1X is 0.15 mrad or less.

The laminated glass 11A, 11XA shown in FIG. 2A and FIG. 2B includes a first lamination glass member 2A, 2XA an interlayer film 1A, 1XA, a second lamination glass member 3A. The first lamination glass member 2A, the interlayer film 1A, 1XA and the second lamination glass member 3A are arranged side by side in this order. The interlayer film 1A, 1XA is arranged between the first lamination glass member 2A and the second lamination glass member 3A.

The interlayer film 1A, 1XA is a multi-layered interlayer film having a two or more-layer structure. Specifically, the interlayer film 1A, 1XA has a three-layer structure. The interlayer film 1A, 1XA includes a second layer 22A, 22XA, a first layer 21A, 21XA, and a third layer 23A, 23XA. The second layer 22A, 22XA, the first layer 21A, 21XA, and the third layer 23A, 23XA are arranged side by side in this order. The first layer 21A, 21XA is arranged between the second layer 22A, 22XA and the third layer 23A, 23XA. The second layer 22A, 22XA is arranged on a first surface side of the first layer 21A, 21XA. The third layer 23A, 23XA is arranged on a second surface side opposite to the first surface of the first layer 21A, 21XA.

The first lamination glass member 2A is a wedge-like shape, and has a wedge angle of 0.10 mrad or more. The interlayer film 1A, 1XA and the second lamination glass member 3A are rectangular shaped, and have a wedge angle of less than 0.10 mrad. The first layer 21A, 21XA, the second layer 22A, 22XA and the third layer 23A, 23XA are rectangular shaped, and have a wedge angle of less than 0.10 mrad. The maximum value of the partial wedge angles A of the interlayer film 1A, 1XA is 0.15 mrad or less.

Figure 3A:
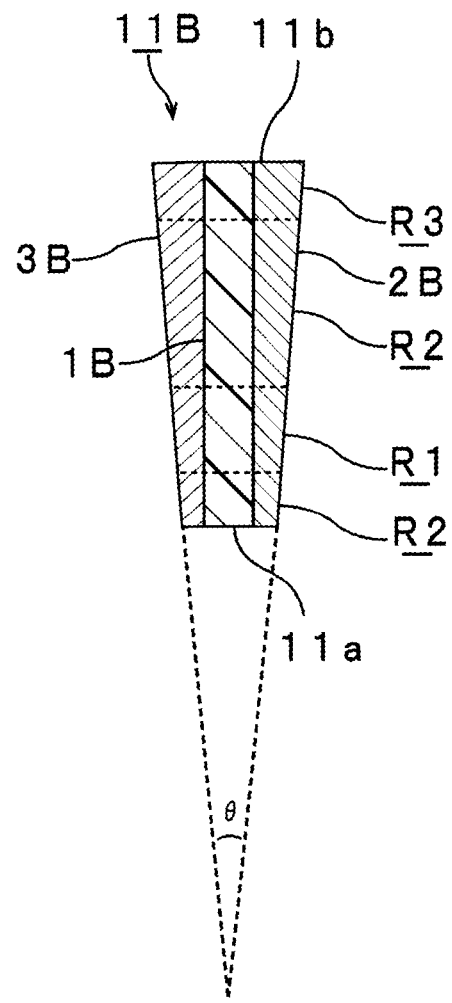
FIG. 3A and FIG. 3B are a sectional view and a front view, respectively, schematically showing a laminated glass, in accordance with an embodiment of the present invention.
Figure 3B:
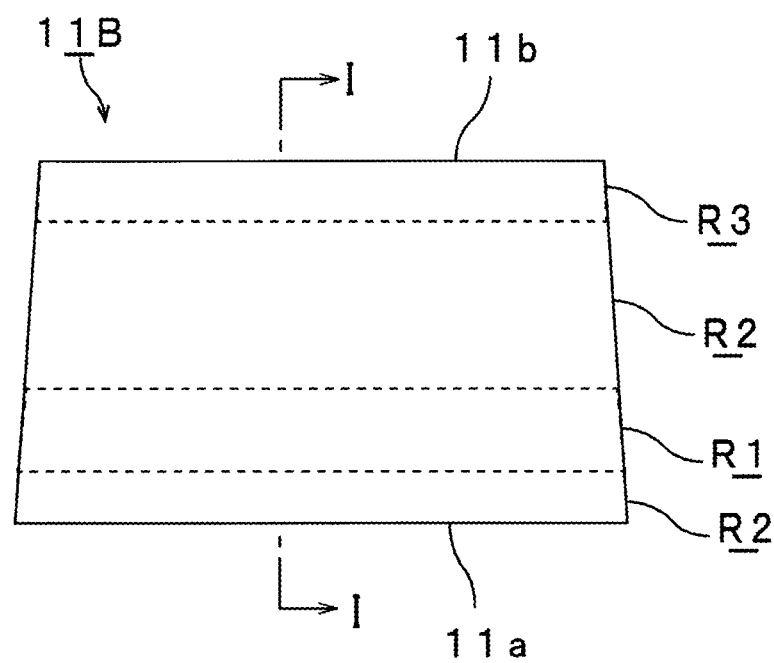
Figure 3C:
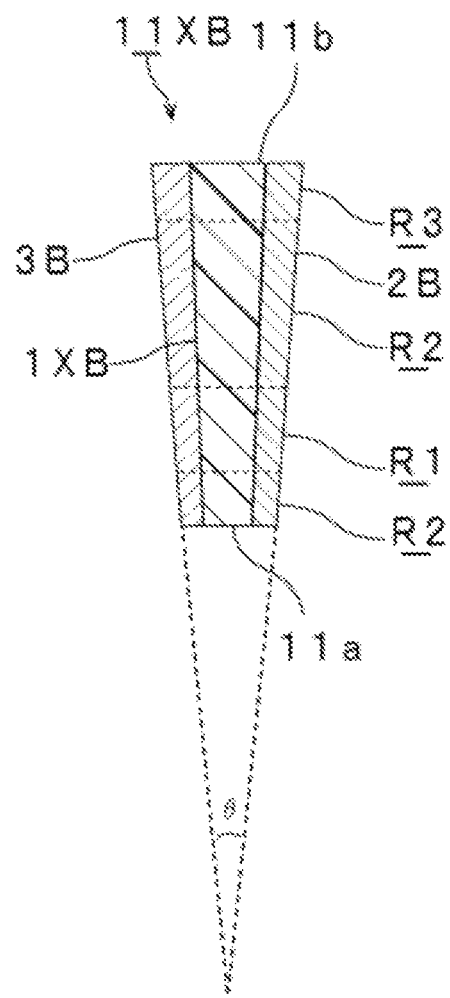
FIG. 3C and FIG. 3D are a sectional view and a front view, respectively, schematically showing a laminated glass, in accordance with an embodiment of the present invention.
Figure 3D:
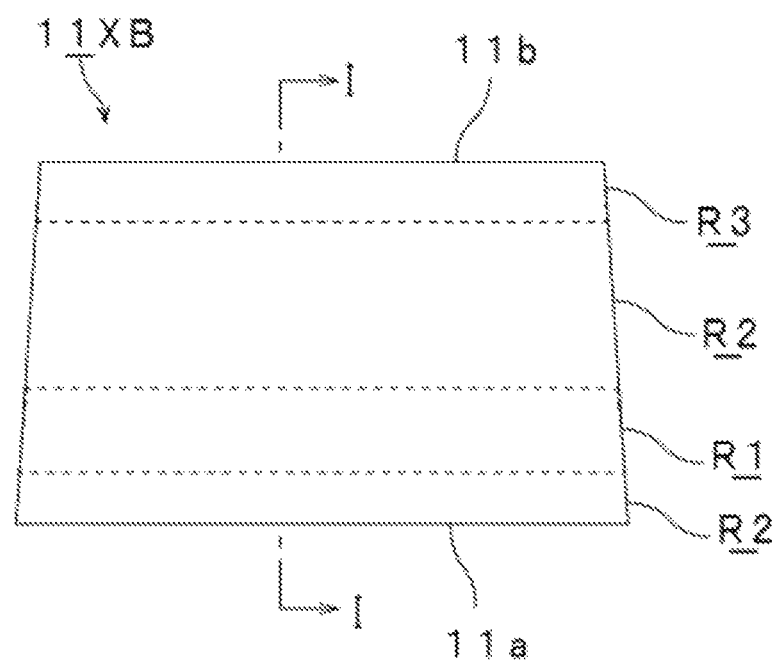
Figure 4A:
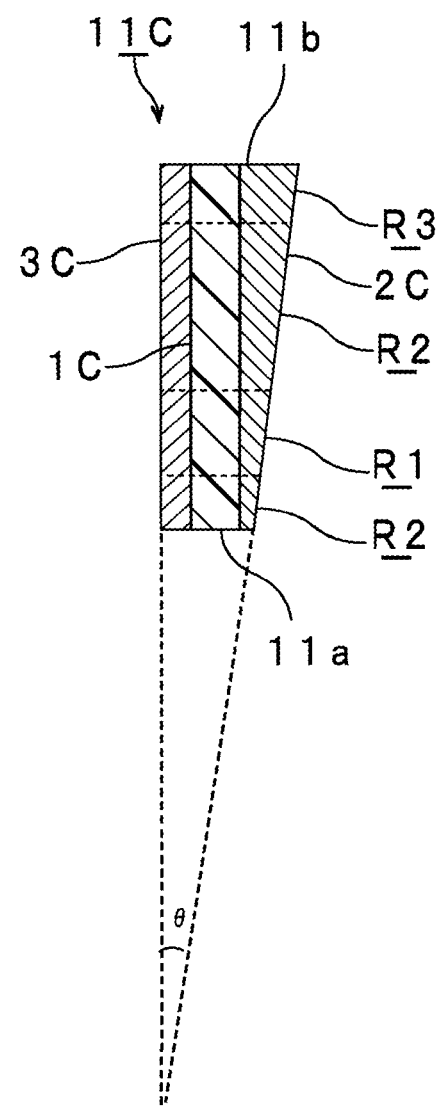
FIG. 4A is a sectional view schematically showing laminated glass in accordance with an embodiment of the present invention.
Figure 4B:
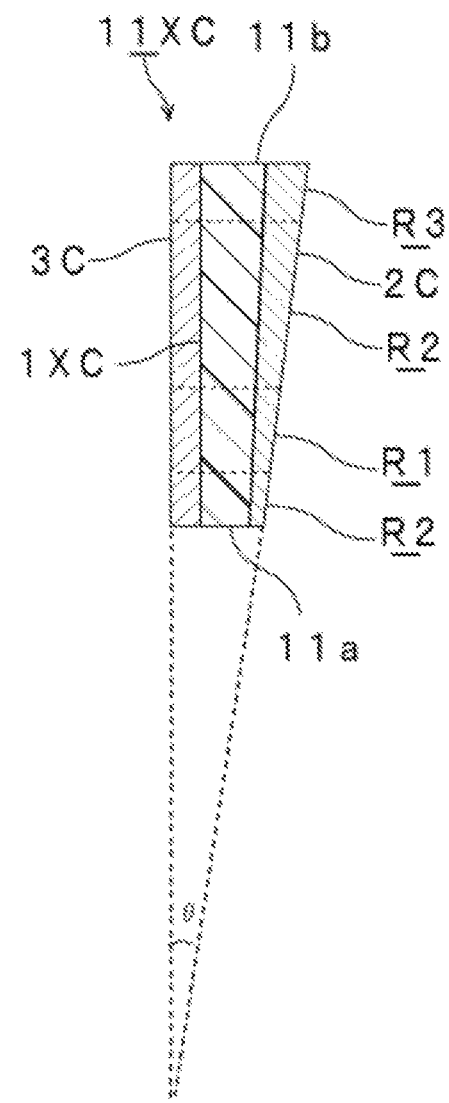
FIG. 4B is a sectional view schematically showing laminated glass in accordance with an embodiment of the present invention.

FIG. 3A and FIG. 3B are a sectional view and a front view, respectively, schematically showing a laminated glass, in accordance with an embodiment of the present invention. FIG. 3A is a sectional view along the line I-I in FIG. 3B. FIG. 3C and FIG. 3D are a sectional view and a front view, respectively, schematically showing a laminated glass, in accordance with an embodiment of the present invention. FIG. 3C is a sectional view along the line I-I in FIG. 3D. FIG. 4A is a sectional view schematically showing laminated glass in accordance with an embodiment of the present invention. FIG. 4B is a sectional view schematically showing laminated glass in accordance with an embodiment of the present invention.

FIG. 3A and FIG. 3B show a laminated glass 11B. FIG. 3C and FIG. 3D show a laminated glass 11XB. FIG. 4A shows a laminated glass 11C. FIG. 4B shows a laminated glass 11XC.

The laminated glass 11B, 11XB, 11C, 11XC has one end 11a and the other end 11b at the opposite side of the one end 11a. The one end 11a and the other end 11b are end parts of both sides facing each other. The thickness of the other end 11b of the laminated glass 11B, 11XB, 11C, 11XC is larger than the thickness of the one end 11a thereof. Accordingly, the laminated glass 11B, 11XB, 11C, 11XC has a region being thinner in thickness and a region being thicker in thickness.

The laminated glass 11B, 11XB, 11C, 11XC is a head-up display. The laminated glass 11B, 11XB, 11C, 11XC has the display region R1 of a head-up display.

The laminated glass 11B, 11XB, 11C, 11XC has the surrounding region R2 neighboring the display region R1.

The laminated glass 11B, 11XB, 11C, 11XC has the shading region R3 that is separate from the display region R1. The shading region R3 is located in an edge portion of the laminated glass 11B, 11XB, 11C, 11XC.

The laminated glass 11B, 11XB shown in FIG. 3A, FIG. 3B, FIG. 3C, and FIG. 3D includes a first lamination glass member 2B, an interlayer film 1B, 1XB and a second lamination glass member 3B. The first lamination glass member 2B, the interlayer film 1B, 1XB and the second lamination glass member 3B are arranged side by side in this order. The interlayer film 1B, 1XB is arranged between the first lamination glass member 2B and the second lamination glass member 3B.

The interlayer film 1B, 1XB is a single-layered interlayer film having a one-layer structure.

The first lamination glass member 2B is a wedge-like shape, and has a wedge angle of 0.10 mrad or more. The second lamination glass member 3B is a wedge-like shape, and has a wedge angle of 0.10 mrad or more. The interlayer film 1B, 1XB is rectangular shaped, and has a wedge angle of less than 0.10 mrad. The maximum value of the partial wedge angles A of the interlayer film 1B, 1XB is 0.15 mrad or less.

The laminated glass 11C, 11XC shown in FIG. 4A and FIG. 4B includes a first lamination glass member 2C, an interlayer film 1C, 1XC and a second lamination glass member 3C. The first lamination glass member 2C, the interlayer film 1C, 1XC, and the second lamination glass member 3C are arranged side by side in this order. The interlayer film 1C, 1XC is arranged between the first lamination glass member 2C and the second lamination glass member 3C.

The interlayer film 1C, 1XC is a single-layered interlayer film having a one-layer structure.

The first lamination glass member 2C is a wedge-like shape, and has a wedge angle of 0.10 mrad or more. The interlayer film 1C, 1XC and the second lamination glass member 3C are rectangular shaped, and have a wedge angle of less than 0.10 mrad. The maximum value of the partial wedge angles A of the interlayer film 1C, 1XC is 0.15 mrad or less.

FIGS. 1 to 4 show interlayer films, lamination glass members and laminated glasses in which the increment in thickness is constant from the one end side toward the other end side. The interlayer film according to the present invention may be an interlayer film having a part in which the increment in thickness varies from one end side toward the other end side. The interlayer film may be an interlayer film having a part in which the increment in thickness increases from one end side toward the other end side, or may be an interlayer film having a part in which the increment in thickness decreases from one end side toward the other end side. From the viewpoint of further suppressing multiple images, it is preferred that the interlayer film be an interlayer film having a part in which the increment in thickness increases from one end side toward the other end side, or be an interlayer film having a part in which the increment in thickness decreases from one end side toward the other end side.

The laminated glass according to the present invention may be a laminated glass having a part in which the increment in thickness varies from one end side toward the other end side. The laminated glass may be a laminated glass having a part in which the increment in thickness increases from one end side toward the other end side, or may be a laminated glass having a part in which the increment in thickness decreases from one end side toward the other end side. From the viewpoint of further suppressing multiple images, it is preferred that the laminated glass be a laminated glass having a part in which the increment in thickness increases from one end side toward the other end side, or be a laminated glass having a part in which the increment in thickness decreases from one end side toward the other end side.

The first lamination glass member may be a lamination glass member having a part in which the increment in thickness varies from one end side toward the other end side. The first lamination glass member may be a lamination glass member having a part in which the increment in thickness increases from one end side toward the other end side, or may be a lamination glass member having a part in which the increment in thickness decreases from one end side toward the other end side. From the viewpoint of further suppressing multiple images, it is preferred that the first lamination glass member be a lamination glass member having a part in which the increment in thickness increases from one end side toward the other end side, or be a lamination glass member having a part in which the increment in thickness decreases from one end side toward the other end side.

When the second lamination glass member is a wedge-like shape, the second lamination glass member may be a lamination glass member in which the increment in thickness varies from one end side toward the other end side. When the second lamination glass member is a wedge-like shape, the second lamination glass member may be a lamination glass member having a part in which the increment in thickness increases from one end side toward the other end side, or may be a lamination glass member having a part in which the increment in thickness decreases from one end side toward the other end side. When the second lamination glass member is a wedge-like shape, it is preferred that the second lamination glass member be a lamination glass member having a part in which the increment in thickness increases from one end side toward the other end side, or be a lamination glass member having a part in which the increment in thickness decreases from one end side toward the other end side from the viewpoint of further suppressing multiple images.

From the viewpoint of enhancing the transparency of the laminated glass, the visible light transmittance of the laminated glass is preferably 65% or more, more preferably 70% or more, further preferably 71% or more, especially preferably 72% or more, most preferably 72.5% or more.

The visible light transmittance at a wavelength ranging from 380 to 780 nm can be measured by using a spectrophotometer ("U-4100" available from Hitachi High-Tech Science Corporation) in conformity with JIS R3211:1998.

From the viewpoint of further enhancing the heat shielding properties, Tts (Total Solar Transmittance) measured in conformity with ISO 13837 of the laminated glass is preferably 60% or less, more preferably 59% or less, further preferably 58% or less, especially preferably 57% or less, most preferably 56% or less.

Tts can be calculated by measuring the transmittance/reflectance at a wavelength of 300 to 2500 nm in conformity with ISO 13837 by using a spectrophotometer ("U-4100" available from Hitachi High-Tech Science Corporation).

From the viewpoint of suppressing the multiple images more effectively, it is preferred that the laminated glass have the display region within a region extending from a position of 6 cm from the one end (thinner side) toward the other end to a position of 63.8 cm from the one end toward the other end. The display region may exist in a part or the whole of the region from a position of 6 cm from the one end toward the other end to a position of 63.8 cm from the one end toward the other end.

It is preferred that the laminated glass have a portion with a sectional shape in the thickness direction of a wedge-like shape. It is preferred that the sectional shape in the thickness direction of the display region be a wedge-like shape. Whether the shape is wedge-like or rectangular can be determined according to the sectional shape in the thickness direction.

From the viewpoint of suppressing the multiple images effectively, it is preferred that the laminated glass have a portion with a sectional shape in the thickness direction of a wedge-like shape in the region between a position of 6 cm toward the other end from the one end and a position of 63.8 cm toward the other end from the one end. The portion with a sectional shape in the thickness direction of a wedge-like shape may exist in a part or the whole of the region to the position of 63.8 mm from the one end toward the other end.

The interlayer film and the laminated glass may have a shading region. The shading region may be separate from the region for display. The shading region is provided so as to prevent a driver from feeling glare while driving, for example, by sunlight or outdoor lighting. The shading region can be provided so as to impart the heat blocking property. It is preferred that the shading region be located in an edge portion of the interlayer film or the laminated glass. It is preferred that the shading region be belt-shaped.

In the shading region, a coloring agent or a filler may be used so as to change the color and the visible light transmittance. The coloring agent or the filler may be contained in a partial region in the thickness direction of the interlayer film or may be contained in the entire region in the thickness direction of the interlayer film or the laminated glass.

From the viewpoint of providing better display, and further broadening the field of view, the visible light transmittance of the region for display and the display region is preferably 80% or more, more preferably 88% or more, further preferably 90% or more. It is preferred that the visible light transmittance of the region for display and the display region be higher than the visible light transmittance of the shading region. The visible light transmittance of the region for display and the display region may be lower than the visible light transmittance of the shading region. The visible light transmittance of the region for display and the display region is higher than the visible light transmittance of the shading region preferably by 50% or more, more preferably by 60% or more.

When the visible light transmittance varies in the region for display, the display region and the shading region, for example, the visible light transmittance is measured at the center position of the region for display, the middle position of the display region, and the center position of the shading region.

It is preferred that the region for display and the display region have a length direction and a width direction. For excellent versatility of the interlayer film and the laminated glass, it is preferred that the width direction of the region for display and the display region be the direction connecting the one end and the other end. It is preferred that the region for display and the display region be belt-shaped.

It is preferred that the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be located on either side of the TD direction.

A distance between the one end and the other end is defined as X. It is preferred that the laminated glass have a minimum thickness in the region at a distance of 0X to 0.2X inwardly from the one end, and a maximum thickness in the region at a distance of 0X to 0.2X inwardly from the other end. It is more preferred that the laminated glass have a minimum thickness in the region at a distance of 0X to 0.1X inwardly from the one end, and a maximum thickness in the region at a distance of 0X to 0.1X inwardly from the other end. It is preferred that the laminated glass have a minimum thickness at the one end and the laminated glass have a maximum thickness at the other end.

The laminated glass may have a uniform-thickness part. The uniform-thickness part means that the variation in thickness does not exceed 10 μm per a distance range of 10 cm in the direction connecting the one end and the other end of the laminated glass. Therefore, the uniform-thickness part refers to the part in which the variation in thickness does not exceed 10 μm per a distance range of 10 cm in the direction connecting the one end and the other end of the laminated glass. To be more specific, the uniform-thickness part refers to the part where the thickness does not vary at all in the direction connecting the one end and the other end of the laminated glass, or the thickness varies by 10 μm or less per a distance range of 10 cm in the direction connecting the one end and the other end of the laminated glass.

The distance X between one end and the other end of the laminated glass is preferably 3 m or less, more preferably 2 m or less, especially preferably 1.5 m or less, and preferably 0.5 m or more, more preferably 0.8 m or more, and especially preferably 1 m or more.

The interlayer film may be wound into a roll shape to form a roll body of the interlayer film. The roll body may be provided with a winding core and the interlayer film. The interlayer film may be wound around an outer periphery of the winding core.

The method for producing the laminated glass is not particularly limited. For example, the interlayer film is sandwiched between the first and second lamination glass members, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for buildings or for vehicles and it is more preferred that the laminated glass be laminated glass for vehicles. The laminated glass can also be used for applications other than these applications. It is especially preferred that the laminated glass be a windshield of an automobile.

Hereinafter, other details of members constituting the laminated glass according to the present invention are described.

(First and Second Lamination Glass Members)

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first and second lamination glass members be a glass plate or a PET (polyethylene terephthalate) film and the laminated glass include at least one glass plate as the first and second lamination glass members. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured plate glass, net plate glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

It is preferred that each of the first lamination glass member and the second lamination glass member be clear glass or heat-ray absorbing plate glass. It is preferred that the heat-ray absorbing plate glass be green glass. The heat-ray absorbing plate glass is heat-ray absorbing plate glass conforming to JIS R3208.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The thickness of the first, second lamination glass members means an average thickness.

(Interlayer Film)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film means an average thickness.

The thickness of the interlayer film is designated as T. The thickness of the first layer is preferably 0.035T or more, more preferably 0.0625T or more, further preferably 0.1T or more and is preferably 0.4T or less, more preferably 0.375T or less, further preferably 0.25T or less, especially preferably 0.15T or less. When the thickness of the first layer is 0.4T or less, the flexural rigidity is further improved.

The thickness of each of the second layer and the third layer is preferably 0.3T or more, more preferably 0.3125T or more, further preferably 0.375T or more and is preferably 0.97T or less, more preferably 0.9375T or less, further preferably 0.9T or less. The thickness of each of the second layer and the third layer may be 0.46875T or less, and may be 0.45T or less. When the thickness of each of the second layer and the third layer is the above-described lower limit or more and the above-described upper limit or less, the rigidity and the sound insulating property of the laminated glass are further enhanced.

A total thickness of the second layer and the third layer is preferably 0.625T or more, more preferably 0.75T or more, further preferably 0.85T or more and is preferably 0.97T or less, more preferably 0.9375T or less, further preferably 0.9T or less. When the total thickness of the second layer and the third layer is the above-described lower limit or more and the above-described upper limit or less, the rigidity and the sound insulating property of the laminated glass are further enhanced.

Thermoplastic Resin:

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of a layer containing the polyvinyl acetal resin and the plasticizer to a lamination glass member or another layer is further enhanced.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The value represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. It is preferred that the main ingredient (50% by weight or more) of the thermoplastic resin of the interlayer film be a polyvinyl acetal resin.

Plasticizer:

From the viewpoint of further enhancing the adhesive force of an interlayer film, it is preferred that the interlayer film contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

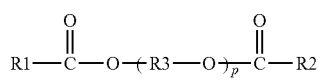
(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 10 parts by weight or more, more preferably 15 parts by weight or more, further preferably 20 parts by weight or more, especially preferably 24 parts by weight or more, and is preferably 40 parts by weight or less, more preferably 35 parts by weight or less, further preferably 32 parts by weight or less, especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further heightening the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

Heat Shielding Substance:

It is preferred that the interlayer film contain a heat shielding substance. It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride (LaBc) particles, and the like. Heat shielding particles other than these may be used. Since the heat ray shielding function is high, preferred are metal oxide particles, more preferred are ATO particles, GZO particles, IZO particles, ITO particles or tungsten oxide particles, further preferred are ATO particles, ITO particles or tungsten oxide particles, and especially preferred are ITO particles or tungsten oxide particles. When the heat shielding particles contain ITO particles or tungsten oxide particles, the heat shielding particles may contain ITO particles and tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

Metal Salt:

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

Ultraviolet Ray Screening Agent:

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, and especially preferably 0.5% by weight or more. In 100% by weight of the interlayer film or in 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, and especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

Oxidation Inhibitor:

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl 0-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer (a first layer, a second layer or a third layer) containing the oxidation inhibitor. Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

Other Ingredients:

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Method for Attaching Laminated Glass)

It is preferred that the laminated glass according to the present invention be attached in the following manner. Specifically, the method for attaching the laminated glass is preferably a method of attaching the laminated glass to an opening between an external space and an internal space into which the heat ray enters from the external space in buildings or vehicles.

To be more specific, the laminated glass is attached to the opening in such a manner that at least one of the first lamination glass member and the second lamination glass member is located on the internal space side, and the other of the first lamination glass member and the second lamination glass member is located on the external space side. That is, the laminated glass is attached so that the arrangement in the order of the internal space/first lamination glass member (or second lamination glass member)/interlayer film/second lamination glass member (or first lamination glass member)/external space is achieved. The above arrangement form includes the case where other member is arranged between the internal space, and the first lamination glass member or the second lamination glass member, and includes the case where other member is arranged between the external space, and the first lamination glass member or the second lamination glass member.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Examples 1, 2, 5 to 8 and Comparative Examples 1, 2, 5, 6

(Method for Preparing Interlayer Film)
Preparation of Composition for Forming First Layer:

The following ingredients were kneaded sufficiently with a mixing roll to obtain a composition for forming a first layer.

Polyvinyl acetal resin (average polymerization degree: 3000, content of hydroxyl group: 22% by mole, acetylation degree: 13% by mole, acetalization degree: 65% by mole): 100 parts by weight Triethylene glycol di-2-ethylhexanoate (3GO): 60 parts by weight An amount that is to be 0.2% by weight in the obtained first layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained first layer of BHT (2,6-di-t-butyl-p-cresol)

Preparation of Composition for Forming Second Layer and Third Layer:

The following ingredients were kneaded sufficiently with a mixing roll to obtain a composition for forming a second layer and a third layer.

Polyvinyl acetal resin (average polymerization degree: 1700, content of hydroxyl group: 30.6% by mole, acetylation degree: 0.9% by mole, acetalization degree: 68.5% by mole): 100 parts by weight Triethylene glycol di-2-ethylhexanoate (3GO): 38 parts by weight An amount that is to be 0.2% by weight in the obtained second layer and third layer of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained second layer and third layer of BHT (2,6-di-t-butyl-p-cresol)

Preparation of Interlayer Film:

The composition for forming the first layer, and the composition for forming the second layer and the third layer were coextruded by using a co-extruder.

In Examples 1, 2, 5 to 8, the lip clearance at the tip end of the die was adjusted so as to smoothen the surface in the extrusion molding of the interlayer film.

In Comparative Examples 1, 2, 5, 6, the operation of smoothening the surface was not performed in the extrusion molding of the interlayer film.

In this manner, a rectangular shaped interlayer film having a multilayer structure of the second layer/the first layer/the third layer was prepared. A thickness ratio of second layer/first layer/third layer was 3.5:1.0:3.5.

(Method for Preparing Laminated Glass)

The laminated glasses prepared in the following manner were evaluated as will described later.

Clear glass having the shape, the thickness (minimum thickness) and the wedge angle shown in the following Table 1 is prepared.

An interlayer film with a size corresponding to the size of the glass plate is sandwiched between the pair of glass plates to obtain a laminate. The obtained laminate is fitted into a frame of an EPDM-made rubber tube (frame member). The rubber tube has a width of 15 mm. Next, the laminate fitted into a frame of an EPDM-made rubber tube is preliminarily press-bonded by a vacuum bag method. The preliminarily press-bonded laminate is subjected to press-bonding at 150° C. and a pressure of 1.2 MPa with the use of an autoclave to obtain a sheet of laminated glass.

Examples 3, 4 and Comparative Examples 3, 4

(Method for Preparing Interlayer Film)
Preparation of Composition for Forming Interlayer Film (First Layer):

The following ingredients were kneaded sufficiently with a mixing roll to obtain a composition for forming an interlayer film.

Polyvinyl acetal resin (average polymerization degree: 1700, content of hydroxyl group: 30.6% by mole, acetylation degree: 0.9% by mole, acetalization degree: 68.5% by mole): 100 parts by weight Triethylene glycol di-2-ethylhexanoate (3GO): 40 parts by weight An amount that is to be 0.2% by weight in the obtained interlayer film of Tinuvin 326 (2-(2'-hydroxy-3'-t-butyl-5-methylphenyl)-5-chlorobenzotriazole, "Tinuvin 326" available from BASF Japan Ltd.)

An amount that is to be 0.2% by weight in the obtained interlayer film of BHT (2,6-di-t-butyl-p-cresol)
Preparation of Interlayer Film:

The composition for forming an interlayer film was extruded by using an extruder.

In Examples 3, 4, the lip clearance at the tip end of the die was adjusted so as to smoothen the surface in the extrusion molding of the interlayer film.

In Comparative Examples 3, 4, the operation of smoothening the surface was not performed in the extrusion molding of the interlayer film.

In this manner, a rectangular shaped interlayer film having an one-layer structure was prepared.
(Method for Preparing Laminated Glass)

The laminated glasses prepared in the following manner were evaluated as will described later.

Clear glass having the shape, the thickness (minimum thickness) and the wedge angle shown in the following Table 2 is prepared.

An interlayer film with a size corresponding to the size of the glass plate was sandwiched between the pair of glass plates to obtain a laminate. The obtained laminate was fitted into a frame of an EPDM-made rubber tube (frame member). The rubber tube has a width of 15 mm. Next, the laminate fitted into a frame of an EPDM-made rubber tube was preliminarily press-bonded by a vacuum bag method. The preliminarily press-bonded laminate is subjected to press-bonding at 150° C. and a pressure of 1.2 MPa with the use of an autoclave to obtain a sheet of laminated glass.
(Evaluation)
(1) Partial Wedge Angle In the obtained interlayer film, partial wedge angles A were measured in the above-described step 1 and step 2 in this order.
(2) Multiple Images The obtained sheet of laminated glass was installed at a position of the windshield. The information to be displayed, which is emitted from a display unit installed below the sheet of laminated glass, was reflected in the laminated glass, and the presence or absence of multiple images at a prescribed position (the center of the display region) was photographed with a camera, and a multiple image distance was evaluated. The multiple image distance refers to the maximum distance between images when an image is seen as multiple images. When multiple images are not generated, the multiple image distance is 0 mm. Multiple images were evaluated by preparing a laminated glass (400 mm long, 300 mm wide) corresponding to a laminated glass partial region of 400 mm long and 300 mm wide including the center of the display region of a laminated glass of Examples and Comparative Examples, and installing the laminated glass to the display region of the windshield.
[Criteria for Judgment on Multiple Images]
  oo: Multiple image distance is less than 1.0 mm.
  o: Multiple image distance is 1.0 mm or more and less than 2.0 mm.
  x: Multiple image distance is 2.0 mm or more.

The details and the results are shown in the following Tables 1, 2.

TABLE 1

| | | | | Example 1 | Comparative Example 1 | Example 2 | Comparative Example 2 | Example 5 | Comparative Example 5 |
|---|---|---|---|---|---|---|---|---|---|
| Configuration of laminated glass | First lamination glass member | Shape | | Wedge-like shape | Wedge-like shape | Wedge-like shape | Wedge-like shape | Wedge-like shape | Wedge-like shape |
| | | Minimum thickness | mm | 2.1 | 2.1 | 2.1 | 2.1 | 2.1 | 2.1 |
| | | Wedge angle | mrad | 0.5 | 0.5 | 0.4 | 0.4 | 0.30 | 0.30 |
| | Interlayer film | Shape | | Rectangular shape | Rectangular shape | Rectangular shape | Rectangular shape | Wedge-like shape | Wedge-like shape |
| | | Average thickness | mm | 0.8 | 0.8 | 0.8 | 0.8 | 0.83 | 0.83 |
| | | Wedge angle | mrad | 0 | 0 | 0 | 0 | 0.05 | 0.06 |
| | | Number of layers | | 3 | 3 | 3 | 3 | 3 | 3 |
| | Second lamination glass member | Shape | | Rectangular shape | Rectangular shape | Wedge-like shape | Wedge-like shape | Rectangular shape | Rectangular shape |
| | | Minimum thickness | mm | 2.1 | 2.1 | 2.1 | 2.1 | 2.1 | 2.1 |
| | | Wedge angle | mrad | 0 | 0 | 0.4 | 0.4 | 0.00 | 0.00 |
| | Shape of laminated glass | | | Wedge-like shape | Wedge-like shape | Wedge-like shape | Wedge-like shape | Wedge-like shape | Wedge-like shape |
| | Minimum thickness of laminated glass | | mm | 5 | 5 | 5 | 5 | 5 | 5 |
| | Wedge angle of laminated glass | | mrad | 0.5 | 0.5 | 0.8 | 0.8 | 0.35 | 0.36 |
| Evaluation | Maximum value of partial wedge angle A | | mrad | 0.12 | 0.18 | 0.13 | 0.16 | 0.11 | 0.18 |
| | Minimum value of partial wedge angle A | | mrad | 0 | 0 | 0 | 0 | 0 | 0 |
| | Multiple images | | | o | x | o | x | o | x |

TABLE 1-continued

|  |  |  |  |  | Example 6 | Comparative Example 6 | Example 7 | Example 8 |
|---|---|---|---|---|---|---|---|---|
| Configuration of laminated glass | First lamination glass member | Shape | | | Wedge-like shape | Wedge-like shape | Wedge-like shape | Wedge-like shape |
| | | Minimum thickness | mm | | 2.1 | 2.1 | 2.1 | 2.1 |
| | | Wedge angle | mrad | | 0.20 | 0.20 | 0.40 | 0.30 |
| | Interlayer film | Shape | | | Wedge-like shape | Wedge-like shape | Rectangular shape | Rectangular shape |
| | | Average thickness | mm | | 0.83 | 0.83 | 0.80 | 0.80 |
| | | Wedge angle | mrad | | 0.05 | 0.04 | 0 | 0 |
| | | Number of layers | | | 3 | 3 | 3 | 3 |
| | Second lamination glass member | Shape | | | Wedge-like shape | Wedge-like shape | Rectangular shape | Wedge-like shape |
| | | Minimum thickness | mm | | 2.1 | 2.1 | 2.1 | 2.1 |
| | | Wedge angle | mrad | | 0.20 | 0.20 | 0.00 | 0.30 |
| | Shape of laminated glass | | | | Wedge-like shape | Wedge-like shape | Wedge-like shape | Wedge-like shape |
| | Minimum thickness of laminated glass | | mm | | 5 | 5 | 5 | 5 |
| | Wedge angle of laminated glass | | mrad | | 0.45 | 0.44 | 0.40 | 0.60 |
| Evaluation | Maximum value of partial wedge angle A | | mrad | | 0.13 | 0.21 | 0.08 | 0.08 |
| | Minimum value of partial wedge angle A | | mrad | | 0 | 0 | 0 | 0 |
| | Multiple images | | | | ○ | x | ○○ | ○○ |

TABLE 2

|  |  |  |  | Example 3 | Comparative Example 3 | Example 4 | Comparative Example 4 |
|---|---|---|---|---|---|---|---|
| Configuration of laminated glass | First lamination glass member | Shape | | Wedge-like shape | Wedge-like shape | Wedge-like shape | Wedge-like shape |
| | | Minimum thickness | mm | 2.1 | 2.1 | 2.1 | 2.1 |
| | | Wedge angle | mrad | 0.3 | 0.3 | 0.35 | 0.35 |
| | Interlayer film | Shape | | Rectangular shape | Rectangular shape | Rectangular shape | Rectangular shape |
| | | Average thickness | mm | 0.8 | 0.8 | 0.8 | 0.8 |
| | | Wedge angle | mrad | 0 | 0 | 0 | 0 |
| | | Number of layers | | 1 | 1 | 1 | 1 |
| | Second lamination glass member | Shape | | Rectangular shape | Rectangular shape | Wedge-like shape | Wedge-like shape |
| | | Minimum thickness | mm | 2.1 | 2.1 | 2.1 | 2.1 |
| | | Wedge angle | mrad | 0 | 0 | 0.35 | 0.35 |
| | Shape of laminated glass | | | Wedge-like shape | Wedge-like shape | Wedge-like shape | Wedge-like shape |
| | Minimum thickness of laminated glass | | mm | 5 | 5 | 5 | 5 |
| | Wedge angle of laminated glass | | mrad | 0.3 | 0.3 | 0.7 | 0.7 |
| Evaluation | Maximum value of partial wedge angle A | | mrad | 0.14 | 0.17 | 0.11 | 0.16 |
| | Minimum value of partial wedge angle A | | mrad | 0 | 0 | 0 | 0 |
| | Multiple images | | | ○ | x | ○ | x |

In this connection, sheets of laminated glass prepared with interlayer films obtained in Examples 1, 2, 5 to 8 respectively were evaluated for the sound insulating properties with sound transmission losses, and as a result, it was confirmed that the sheets of laminated glass were excellent in sound insulating properties.

EXPLANATION OF SYMBOLS 1, 1A, 1B, 1C, 1X, 1XA, 1XB, 1XC: Interlayer film
2, 2A, 2B, 2C: First lamination glass member
3, 3A, 3B, 3C: Second lamination glass member
11, 11A, 11B, 11C, 11X, 11XA, 11XB, 11XC: Laminated glass
11a: One end
11b: Other end
21, 21A, 21X, 21XA: First layer
22, 22A, 22X, 22XA: Second layer
23, 23A, 23X, 23XA: Third layer

The invention claimed is:

1. A laminated glass having one end, and the other end being at an opposite side of the one end and having a thickness larger than a thickness of the one end,
   the laminated glass including a first lamination glass member, a second lamination glass member, and an interlayer film arranged between the first lamination glass member and the second lamination glass member,
   the first lamination glass member having a wedge angle of 0.10 mrad or more,
   (1) the interlayer film having a wedge angle of less than 0.05 mrad and a maximum value of partial wedge angles A of the interlayer film being 0.07 mrad or more and 0.15 mrad or less, or (2) the interlayer film having a wedge angle of 0.05 mrad or more and less than 0.10 mrad and a maximum value of partial wedge angles A of the interlayer film being 0.11 mrad or more and 0.15 mrad or less, the partial wedge angles A of the interlayer film being measured
in a step 1 and a step 2 in this order,
the step 1 being selecting points A at 2-mm intervals starting at the position of 20 cm from the one end toward the other end of the interlayer film and ending at the position of 20 cm from the other end toward the one end of the interlayer film,
the step 2 being calculating the partial wedge angles A of the interlayer film in each partial region A of 80 mm centered at each of the points A in a direction connecting the one end and the other end.

2. The laminated glass according to claim 1, wherein the maximum value of the partial wedge angles A is 0.13 mrad or less.

3. The laminated glass according to claim 1, wherein the laminated glass has a wedge angle of 0.10 mrad or more.

4. The laminated glass according to claim 1, wherein the second lamination glass member has a wedge angle of 0.10 mrad or more.

5. The laminated glass according to claim 1, wherein
the laminated glass is a laminated glass that is a head-up display, and
the laminated glass has a display region of the head-up display.

6. The laminated glass according to claim 1, wherein the interlayer film contains a thermoplastic resin.

7. The laminated glass according to claim 1, wherein the interlayer film contains a plasticizer.

8. The laminated glass according to claim 1, wherein the interlayer film comprises a first layer; and a second layer arranged on a first surface side of the first layer.

9. The laminated glass according to claim 8, wherein the interlayer film further comprises a third layer arranged on a second surface side opposite to the first surface side of the first layer.

10. The laminated glass according to claim 1, wherein the interlayer film comprises a heat shielding substance, the heat shielding substance comprising at least one selected from the group consisting of a phthalocyanine compound, a naphthalocyanine compound, and an anthracyanine compound.

11. The laminated glass according to claim 7, wherein the plasticizer comprises an organic phosphate plasticizer, the organic phosphate plasticizer comprising at least one selected from the group consisting of tributoxyethyl phosphate, isodecyl phenyl phosphate, and triisopropyl phosphate.

12. The laminated glass according to claim 1, wherein the interlayer film has the wedge angle of less than 0.10 mrad and the maximum value of partial wedge angles A of the interlayer film is 0.11 mrad or more and 0.15 mrad or less.

13. The laminated glass according to claim 1, wherein the interlayer film has the wedge angle of less than 0.05 mrad and the maximum value of partial wedge angles A of the interlayer film is 0.11 mrad or more and 0.15 mrad or less.

14. The laminated glass according to claim 1, wherein the interlayer film has the wedge angle of less than 0.05 mrad and the maximum value of partial wedge angles A of the interlayer film is 0.07 mrad or more and 0.15 mrad or less.

15. The laminated glass according to claim 1, wherein the interlayer film has the wedge angle of 0.05 mrad or more and less than 0.10 mrad and the maximum value of partial wedge angles A of the interlayer film is 0.11 mrad or more and 0.15 mrad or less.

* * * * *